United States Patent
Keil et al.

(10) Patent No.: US 11,001,156 B2
(45) Date of Patent: May 11, 2021

(54) CHARGING DEVICE HAVING AN INDUCTION COIL STITCHED TO A SURFACE OF A CROSS-LAID STRUCTURE

(71) Applicant: Bayerische Motoren Werke Aktiengesellschaft, Munich (DE)

(72) Inventors: Cornelius Johan Kalle Keil, Goslar (DE); Josef Krammer, Holzkirchen (DE); Tobias Mueller, Landshut (DE); Hartmut Koenig, Hebertshausen (DE); Stefan Opl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 155 days.

(21) Appl. No.: 15/870,071

(22) Filed: Jan. 12, 2018

(65) Prior Publication Data

US 2018/0134165 A1    May 17, 2018

Related U.S. Application Data

(63) Continuation of application No. PCT/EP2016/069251, filed on Aug. 12, 2016.

(30) Foreign Application Priority Data

Sep. 25, 2015  (DE) ............ 10 2015 218 437.4

(51) Int. Cl.
   *H01F 41/04*    (2006.01)
   *B60L 53/124*   (2019.01)
   (Continued)

(52) U.S. Cl.
   CPC .......... *B60L 53/124* (2019.02); *B60L 11/182* (2013.01); *B60L 53/38* (2019.02);
   (Continued)

(58) Field of Classification Search
   CPC ........ B60L 11/182; B60L 53/12; B60L 53/38; B60L 53/124; H01F 27/2823;
   (Continued)

(56) References Cited

U.S. PATENT DOCUMENTS 2,310,684 A    2/1943  Farry
2009/0289505 A1*  11/2009  Baumann ............... A47G 27/02
                                                  307/104

(Continued)

FOREIGN PATENT DOCUMENTS

CN    102089955 A    6/2011
CN    103580102 A    2/2014
(Continued)

OTHER PUBLICATIONS

Inductive power transfer in e-textile applications: Reducing the effects of coil misalignment—Dibin Zhu; Neil J.Grabham; Lindsay Clare; Bernard H. Stark; Steve P. Beeby (Year: 2015).*
(Continued)

*Primary Examiner* — Drew A Dunn
*Assistant Examiner* — Sailesh Thapa
(74) *Attorney, Agent, or Firm* — Crowell & Moring LLP

(57) ABSTRACT

A method is provided for producing an induction coil, in particular for a charging device for the cableless charging of an electrical energy storage device of an electrically driven motor vehicle. At least one coil wire is placed on a carrier fabric in a conductor loop-type coil pattern. The coil wire is stitched to the carrier fabric via at least one stitching wire.

9 Claims, 5 Drawing Sheets

(51) Int. Cl.
    *B60L 11/18*     (2006.01)
    *H01F 27/28*     (2006.01)
    *H02J 7/02*     (2016.01)
    *B60L 53/38*     (2019.01)
    *H02J 50/60*     (2016.01)

(52) U.S. Cl.
    CPC ......... *H01F 27/2823* (2013.01); *H01F 41/04* (2013.01); *H02J 7/025* (2013.01); *H02J 50/60* (2016.02); *Y02T 10/70* (2013.01); *Y02T 10/7072* (2013.01); *Y02T 90/12* (2013.01); *Y02T 90/14* (2013.01)

(58) Field of Classification Search
    CPC ........... H01F 41/04; H02J 50/60; H02J 7/025; Y02T 10/7005; Y02T 90/125; Y02T 90/12; Y02T 10/7072; Y02T 90/121; Y02T 90/14; Y02T 90/122; Y02T 10/70
    See application file for complete search history.

(56) References Cited

U.S. PATENT DOCUMENTS

| | | | |
|---|---|---|---|
| 2009/0290332 A1* | 11/2009 | Jacobs | H05B 45/37 362/183 |
| 2010/0117596 A1 | 5/2010 | Cook et al. | |
| 2010/0199901 A1 | 8/2010 | Kang et al. | |
| 2010/0219183 A1* | 9/2010 | Azancot | H01F 38/14 219/676 |
| 2010/0314946 A1* | 12/2010 | Budde | H02J 5/005 307/104 |
| 2012/0262002 A1 | 10/2012 | Widmer et al. | |
| 2014/0035565 A1 | 2/2014 | Enthaler et al. | |
| 2014/0285008 A1* | 9/2014 | Azancot | H01F 38/14 307/24 |
| 2016/0325631 A1* | 11/2016 | Lannoije | B60L 53/124 |

FOREIGN PATENT DOCUMENTS

| | | |
|---|---|---|
| DE | 10 2009 049 432 A1 | 4/2011 |
| DE | 10 2011 118 397 A1 | 5/2012 |
| DE | 10 2012 006 919 A1 | 10/2013 |
| DE | 10 2012 015 262 A1 | 2/2014 |
| DE | 10 2013 111 266 A1 | 4/2015 |
| DE | 10 2014 203 037 A1 | 8/2015 |
| EP | 1 779 752 A1 | 5/2007 |
| EP | 2 754 222 B1 | 11/2015 |
| GB | 2520990 A | 6/2015 |
| JP | 6-2659 U | 1/1994 |
| WO | WO 2008/050292 A2 | 5/2008 |
| WO | WO 2011/044969 A2 | 4/2011 |

OTHER PUBLICATIONS

International Search Report (PCT/ISA/210) issued in PCT Application No. PCT/EP2016/069251 dated Oct. 13, 2016 with English translation (seven pages).

German-language Written Opinion (PCT/ISA/237) issued in PCT Application No. PCT/EP2016/069251 dated Oct. 13, 2016 (six pages).

German-language Search Report issued in counterpart German Application No. 10 2015 218 437.4 dated Mar. 30, 2016 with partial English translation (12 pages).

Chinese-language Office Action issued in counterpart Chinese Application No. 201680035453.5 dated Sep. 3, 2019 with English translation (14 pages).

Chinese Office Action issued in Chinese application No. 201680035453.5 dated May 28, 2020, with English translation (Twelve (12) pages).

* cited by examiner

CHARGING DEVICE HAVING AN INDUCTION COIL STITCHED TO A SURFACE OF A CROSS-LAID STRUCTURE

CROSS REFERENCE TO RELATED APPLICATIONS

This application is a continuation of PCT International Application No. PCT/EP2016/069251, filed Aug. 12, 2016, which claims priority under 35 U.S.C. § 119 from German Patent Application No. 10 2015 218 437.4, filed Sep. 25, 2015, the entire disclosures of which are herein expressly incorporated by reference.

BACKGROUND AND SUMMARY OF THE INVENTION

The invention relates to a method for the production of an induction coil, in particular for a charging device for wirelessly charging an electrical energy accumulator of an electrically drivable motor vehicle, for example a "plug-in" hybrid vehicle.

Electrically drivable motor vehicles, such as for example hybrid vehicles, usually have an electric motor by way of which one or both vehicle axles of the motor vehicle are drivable. For the purpose of being supplied with electrical energy, the electric motor is typically coupled to a vehicle-internal electrical energy accumulator. In order for the energy accumulator to be charged, in the case of a recuperative or generative operation of the electric motor it is known for electrical energy to be fed into the energy accumulator during a use of the motor vehicle, for example. Additionally or alternatively, in the case of "plug-in" hybrid vehicles, it is known for the energy accumulator to be charged by being coupled to an electric grid. The coupling can be implemented for example by means of a power cable or by means of a wireless charging device.

A charging device of this type includes substantially two components, specifically a secondary coil on the vehicle side, in the region of a vehicle floor, and a (vehicle-external) ground plate having an integrated primary coil. The ground plate is typically disposed so as to be locationally fixed below the vehicle, for example on or in a garage floor, and is connected to the electric grid. The electrical energy from the electrical grid is transmittable in a non-contacting and wireless manner by way of an alternating magnetic field from the primary coil to the secondary coil that is coupled to the energy accumulator. Wear-free and particularly user-friendly charging of the energy accumulator is enabled on account thereof. As compared to cable-bound charging, wireless or inductive charging is thus a particularly convenient solution for a vehicle user.

For the purpose of an energy transmission between the induction coils that is as effective as possible, exact positioning of the motor vehicle or of the secondary coil, respectively, above the primary coil is necessary. To this end, the positioning of the motor vehicle is typically performed by means of individual coils as a measuring and sensor coil assembly which determines the spacing between the induction coils by way of electromagnetic signals. Sensor coil assemblies of this type are often formed by conductor paths of a printed circuit and are disposed directly above the primary coil.

Additionally to positioning the vehicle, sensor coil assemblies of this type furthermore serve for continuously monitoring an intermediate space between the primary coil and the secondary coil during charging. In the case of an ingress by foreign matter, in particular in the case of an ingress of inductive materials such as, for example, metal parts or aluminum paper, the charging procedure is aborted or at least temporarily interrupted, since said materials can be heated or combusted in a charging procedure.

Typical charging devices have a complex construction of the induction and sensor coils, said complex construction being associated with high production costs and a high installation weight. In particular in the case of vehicle-internal secondary coils, the high installation weight has a negative effect on the range and on the electrical output of the energy accumulator or of the electric motor respectively. On account thereof, the efficiency of the plug-in hybrid vehicle is disadvantageously reduced.

The invention is based on the object of providing a method for the production of an induction coil, which is particularly simple and cost-effective. Furthermore, the induction coil produced according to the method is to be as low in weight as possible.

The invention is furthermore based on the object of providing a charging device for inductively charging an energy accumulator of a motor vehicle, in which a primary and/or a secondary coil is produced by a method of this type.

These and other objects are achieved by a method for producing an induction coil for a charging device, as well as by a charging device having such an induction coil, in accordance with embodiments of the invention.

According to the method for the production of an induction coil, one or a plurality of coil wires are installed as the coil winding on a carrier cross-laid structure in a conductor-loop, for example a circular, coil profile, such that an (induction) coil that is suitable for induction is formed. The coil wire is subsequently fastened by stitching to the carrier cross-laid structure by way of a number of stitching wires. A particularly simple and cost-effective production of the induction coil is enabled by the stitched fastening of the coil wires to the carrier cross-laid structure. Subsequently, the carrier cross-laid structure having the coil stitched thereonto in the context of a component, for example for an inductive charging device, can be used and assembled like a conventionally wound coil.

Stitching, or fastening by stitching, respectively, hereunder is to be understood in particular as applying or sewing of the coil wire (upper thread) to the carrier cross-laid structure (embroidery base fabric) by way of the stitching wire (fastening thread). For the purpose of being fixed by stitching, the coil wire by way of the stitching wire is fastened to the carrier cross-laid structure, for example in the manner of a zigzag stitch. To this end, the coil wire is guided on the upper side of the carrier cross-laid structure, for example, and the stitching wire is subsequently stitched in a substantially rectangular manner across the coil wire. Fastening by means of the stitching wire is desirably performed substantially across the entire length of the coil wire, on account of which a particularly vibration free and operationally reliable fastening to the carrier cross-laid structure is ensured.

In one preferred application, the method according to the invention is used for the production of a secondary and/or primary coil of an inductive charging device. A charging device of this type is preferably employable for wireless charging of an electrical energy accumulator of an electrically drivable or driven motor vehicle. The preferably locationally fixed primary coil is coupled to or couplable to an electric grid and is inductively coupled to or coupleable to a secondary coil that is disposed on the vehicle side in order to charge the energy accumulator. For the purpose of a facilitated positioning of the secondary coil in the region of the primary coil, and for identifying foreign matter, the charging device furthermore includes a sensor coil assembly.

An induction coil that is produced according to the invention is particularly desirable in particular in an installation situation in which the former is a vehicle-internal secondary coil. In particular, the low coil weight herein is reflected advantageously in the range and in the electrical output of an electrical energy accumulator on the vehicle side and thus in the efficiency of the motor vehicle overall.

In comparison to a conventional winding process, a particularly high degree of freedom and flexibility in the design embodiment of the coil windings/coilings and of the coil profile is implemented on account of fixing the coil wires to the carrier cross-laid structure by stitching/sewing. For example, a copper wire, in particular a high-voltage stranded conductor, which by way of the stitching wires is stitched (sewn) to the carrier cross-laid structure that is preferably produced from a composite material, in particular from a fiber-reinforced plastics material, is implementable as coil wire.

In one particularly advantageous design embodiment, the carrier cross-laid structure and the later component are preferably produced from the same type of fiber, for example glass fiber. An integral construction mode of the induction coil and of the later component in the context of a functional integration is enabled by stitching the coil wires to the mechanically utilizable fiber material of the carrier cross-laid structure.

In comparison to a conventional (wound) coil, stitching the coil wires according to the invention enables a particularly flexible coil profile. On account thereof, it is possible, for example, for the induction coil in terms of geometry to be adapted and optimized in relation to a specific installation situation. The design embodiment of the coil profile in operation has an effect in particular on the intensity and the direction of the alternating magnetic field and thus on the inductive coupling of the primary and the secondary coil. By way of an optimized adaptation of the coil geometry, an improved transmission of energy is ensured, this being advantageously reflected in the efficiency of the charging device. On account thereof, for example, the charging time during charging of the energy accumulator is substantially shortened.

The positioning and the profile of the coil wires, and the shape of the carrier cross-laid structure, are thus preferably adapted to the respective available installation spaces of the later components, or of the primary and/or the secondary coil.

In one preferred refinement, the coil wire is installed on or sewn to, respectively, the carrier cross-laid structure in particular in an approximately helical coil profile, in particular in the manner of a flat helical coil. On account thereof, an induction coil which in terms of installation height is reduced is implemented, on account of which a particularly flexible utilization of an available installation space is ensured.

The coil profile in the context of the invention is, for example, annular or preferably square, in particular having rounded corner regions. On account thereof, an approximately square-shaped component in which substantially the entire area is effectively utilizable for the transmission of energy and/or data is provided. Furthermore, a component that is reduced in terms of weight and volume is implemented on account thereof, additional degrees of freedom for the design of the installation space being achieved on account thereof.

In one advantageous embodiment, the coil wire is disposed in paths of the coil profile that run in a substantially parallel manner. In the course of a helical flat coil in which the coil wire is stitched to the carrier cross-laid structure in a helical manner, the parallel running paths are formed substantially by the neighboring helical windings. To this end the coil wire preferably has an electrically insulating sheathing in order for a short-circuited coil to be avoided. For example, the external sheathing also serves for the mechanical decoupling from the carrier cross-laid structure.

In one potential design embodiment, in the case of fastening by stitching, a plurality of neighboring paths of the coil wire are spanned by a single stitching wire. On account thereof, the complexity of the stitched fastening to the carrier cross-laid structure is simplified, this being conducive to a particularly simple and time-saving production of the induction coil.

For example, the coil wire is embodied as a stranded conductor, wherein the stitching method according to the invention enables in particular a subdivision of the stranded conductor of the coil into a plurality of comparatively smaller part-strands or individual wires. The flexibility according to the invention in the arrangement of the coil wire on the carrier cross-laid structure enables in one preferred refinement the individual wires to be installed in a permuting manner in paths that are guided in a substantially parallel manner. To this end, each individual wire, or each part-strand, respectively, in the coil profile preferably assumes each position of the path at least once. On account thereof, a strand-type "twisting" of the individual wires of the coil wire is substantially performed within the parallel paths. In a manner similar to a conventional stranded conductor, a non-uniform distribution of the coil current is prevented by said twisting.

Thus, instead of a single stranded conductor having a cross-sectional diameter of a plurality of square millimeters (mm2), a plurality of particularly cost-effective individual wires are utilizable. The individual wires herein have a comparatively smaller diameter of, for example, 0.1 mm2, wherein the individual wires in terms of the overall cross-section thereof are preferably equivalent to a conventional stranded conductor. By installing and stitching a plurality of neighboring individual wires instead of a single stranded conductor, the induction coil in terms of the installation height thereof is capable of being embodied in a particularly flat manner, on account of which a particularly space-saving embodiment which in a typical installation situation achieves additional installation space is implemented. On account thereof, degrees of freedom in terms of the design embodiment of the coil profile, and a particularly cost effective production of the induction coil, furthermore result.

In one expedient refinement, a sensor wire of a sensor coil of the sensor coil assembly is stitched to the carrier cross-laid structure. On account thereof, the induction coil and the sensor coil assembly are embodied substantially as one common component on account of which a particularly space-saving component is provided for the charging device.

The sensor wire which is embodied from enameled wire, for example, in one expedient refinement has fewer coilings and a smaller wire cross section than the coil wire. However, it is likewise conceivable that the sensor wire for the purpose of improved electrical decoupling is stitched to a second carrier cross-laid structure, for example. The sensor coil assembly in principle is thus likewise produced, or producible, respectively, according to the invention by means of stitching/sewing, wherein in particular the sensor wire is used as the coil wire.

By virtue of the freedom in terms of geometry in the fastening by stitching, it is likewise possible for a functional geometry to be chosen for the purpose of a reduction of an installation space for the installation of the sensor wire. For this purpose, the sensor wire in one advantageous embodiment is disposed in particular so as to be centric within the coil profile. The sensor wire is preferably stitched to the carrier cross-laid structure by way of the same stitching wire as the coil wire.

The space about the center of the induction coil by virtue of the small area and of the number of coilings that are limited on account thereof is suitable only to a limited extent for a transmission of energy between the primary and the secondary coil. The sensor coil of the sensor coil assembly, as a consequence of the function thereof, requires substantially less area for the transmission of data for determining the position and for identifying foreign matter such that the arrangement of the sensor coil in a centric manner within the coil profile is performed in a particularly space-saving manner without limiting the transmission of energy.

For the purpose of improved positioning and of improved identification of foreign matter, the sensor coil assembly in one preferred design embodiment is formed in particular by an array of neighboring sensor coils, said array extending substantially across the entire area of the carrier cross-laid structure. For this purpose, the sensor coils are at least partially fastened by stitching across the coil profile of the induction coil.

In one particularly preferred embodiment, the stitching wire is produced from an electrically conductive material. On account thereof, the stitching wire is additionally employable as a sensor, on account of which the functionality of the induction coil is improved and extended. In one potential embodiment, the stitching wire in the operation of the induction coil is perfused with a current, for example. On account thereof, by detecting the stitching wire current, an identification of damage to the coil wire, for example by way of an interruption of the stitching wire or of the stitching wire current, respectively, is enabled in a simple manner.

By virtue of stitching onto mechanically utilizable fibers of the carrier cross-laid structure, the advantages that are achieved by way of the invention lie in particular in the integral construction mode of the induction coil and of the later component structure. As compared to conventionally wound coils, a particularly space-saving and weight-saving coil construction which in particular enables a particularly high flexibility in terms of the geometry of the coil profile is provided by way of stitching or sewing according to the invention. A higher transmission of energy and on account thereof an improved efficiency of the charging device are achieved on account of the above.

An improved combination capability of the induction coil for the transmission of energy and of the sensor coil for positioning and for identifying foreign matter is ensured by stitching the coil wire and the sensor wire. Furthermore, an additional sensor system for identifying damage to the induction coil is provided by the use of an electrically conductive stitching wire.

Other objects, advantages and novel features of the present invention will become apparent from the following detailed description of one or more preferred embodiments when considered in conjunction with the accompanying drawings.

Mutually equivalent parts and variables in all figures are at all times provided with the same reference signs.

DETAILED DESCRIPTION OF THE DRAWINGS

Figure 1:
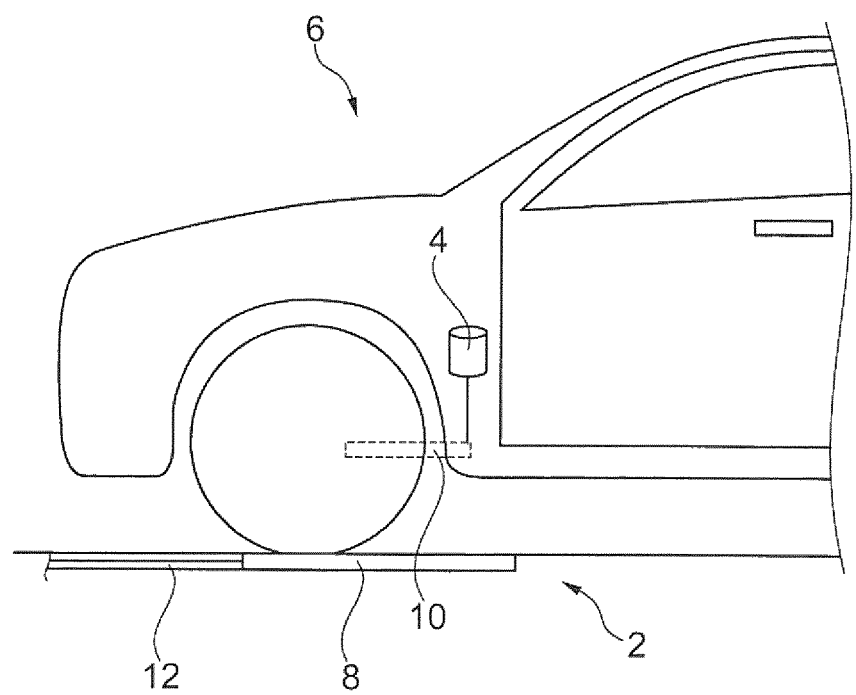
FIG. 1 is a schematic lateral illustration of an electrically drivable motor vehicle in a charging procedure on an inductive charging device comprising a primary coil system on the hard ground and a secondary coil system on the vehicle side.

An inductive charging device 2 for charging an electrical energy accumulator 4 of an electrically drivable motor vehicle 6 is illustrated in FIG. 1. The motor vehicle 6 is in particular a "plug-in" hybrid vehicle, wherein the electrical energy for the purpose of driving an electric motor (not illustrated in more detail) can be fed from the energy accumulator 4. The energy accumulator 4 is, for example, a high-voltage battery or a high-voltage accumulator.

The charging device 2 serves for wirelessly charging the energy accumulator 4 by inductively coupling an induction coil system according to the transformer principle. For this purpose, the charging device 2 has a primary coil system 8 on the ground and a secondary coil system 10 on the vehicle side.

The secondary coil system 10 is disposed in a floor region of the motor vehicle 6 that faces the ground, and for the purpose of an effective transmission of energy during a charging procedure is positioned substantially above the locationally fixed primary coil system 8.

The primary coil system 8 is connected to a power grid by way of a power cable 12. The primary coil system 8 thus provides electrical energy from the power grid and during a charging procedure by way of an alternating magnetic field transmits the latter to the secondary coil system 10. As becomes evident in FIGS. 3 to 5, the primary coil system 8 and the secondary coil system 10 for this purpose have, in each case, one induction coil 14, 16. The induction coils 14, 16 are also referred to herein as a primary coil 14 and a secondary coil 16.

The secondary coil system 10 has essentially a shielding plate 18 and a component 20 which includes the secondary coil 16. The shielding plate 18 is produced from a paramagnetic and electrically conductive material, for example from an aluminum material, and prevents an undesirable radiation of the alternating magnetic field in the direction of a vehicle interior. The component 20 on the upper side thereof, that is to say that side that faces away from the ground surface, for the purpose of improved stability has a metal plate 22 (for example, made from an aluminum material).

The component 20 furthermore includes a ferrite plate 24 for reducing the magnetic resistance for the purpose of improving the inductive coupling between the secondary coil 16 and the primary coil 14. The secondary coil 16 is disposed below the ferrite plate 24. The secondary coil 16 has a coil wire 26 which is installed in a conductor-loop arrangement having a plurality of windings on a carrier cross-laid structure 28 and is fastened by stitching, or stitched, respectively, to the latter by way of a stitching wire 30. For the protection of the secondary coil 16, the remaining installation space within the component 20 is filled with a magnetically neutral protective material 32.

For example, the coil wire 26 is a high-voltage stranded conductor which is installed on the carrier cross-laid structure 28 in an approximately helical manner having approximately 10 to 30 windings. The carrier cross-laid structure 28 is made from a composite material, in particular from a fiber-reinforced plastics material, preferably from glass fiber. The protective material 32 is preferably made from the same material as the carrier cross-laid structure 28 such that a substantially integral construction mode of the carrier cross-laid structure 28 in the protective material 32 is implemented.

Figure 2:
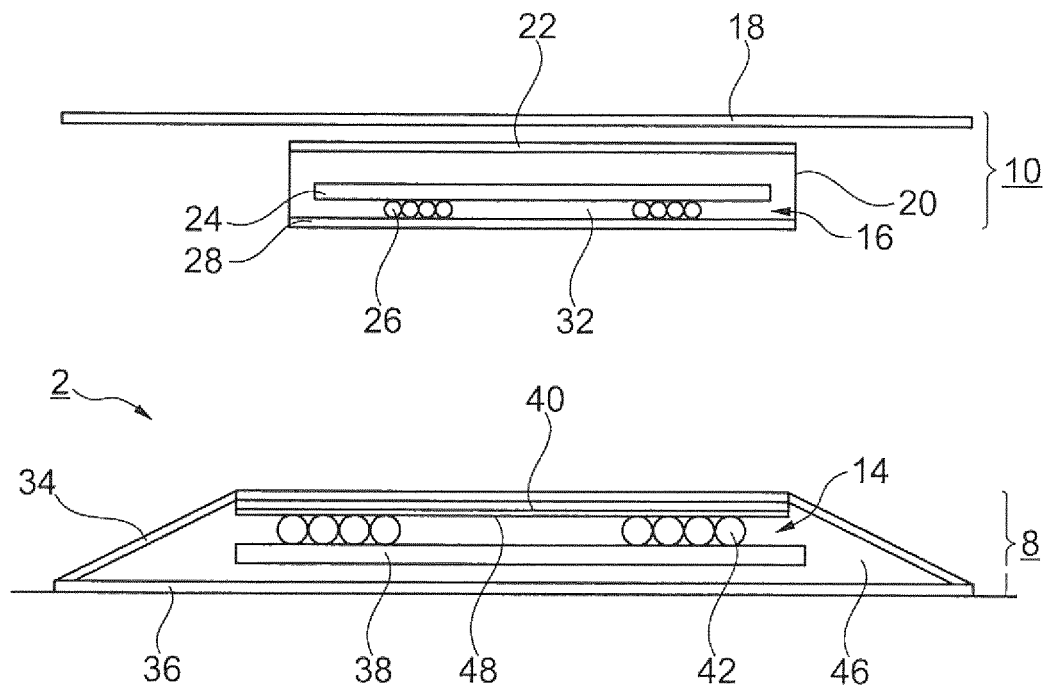
FIG. 2 is a schematic lateral illustration of the construction of the secondary coil system and of a primary coil system that is disposed on the hard ground.

The primary coil system 8 illustrated in FIG. 2 includes an approximately trapezoidal overrun protection 34 made from a magnetically and electrically neutral material, as a protection of the primary coil 14 against mechanical overload. The primary coil system 8 is constructed in a manner substantially similar to that of the secondary coil system 10 and has a shielding plate 36 on the hard ground, a ferrite plate 38, and a coil wire 42 that is installed on a carrier cross-laid structure 40 which by way of a stitching wire 44 is fastened by stitching in order to form the primary coil 14. The interior space of the primary coil system 8 is filled with a protective material 48 in order to improve the stability and the mechanical protection of the primary coil 14. The primary coil system 8 furthermore has a sensor coil assembly 48 which is disposed between the carrier cross-laid structure 40 and the coil wire 42.

Figure 3:
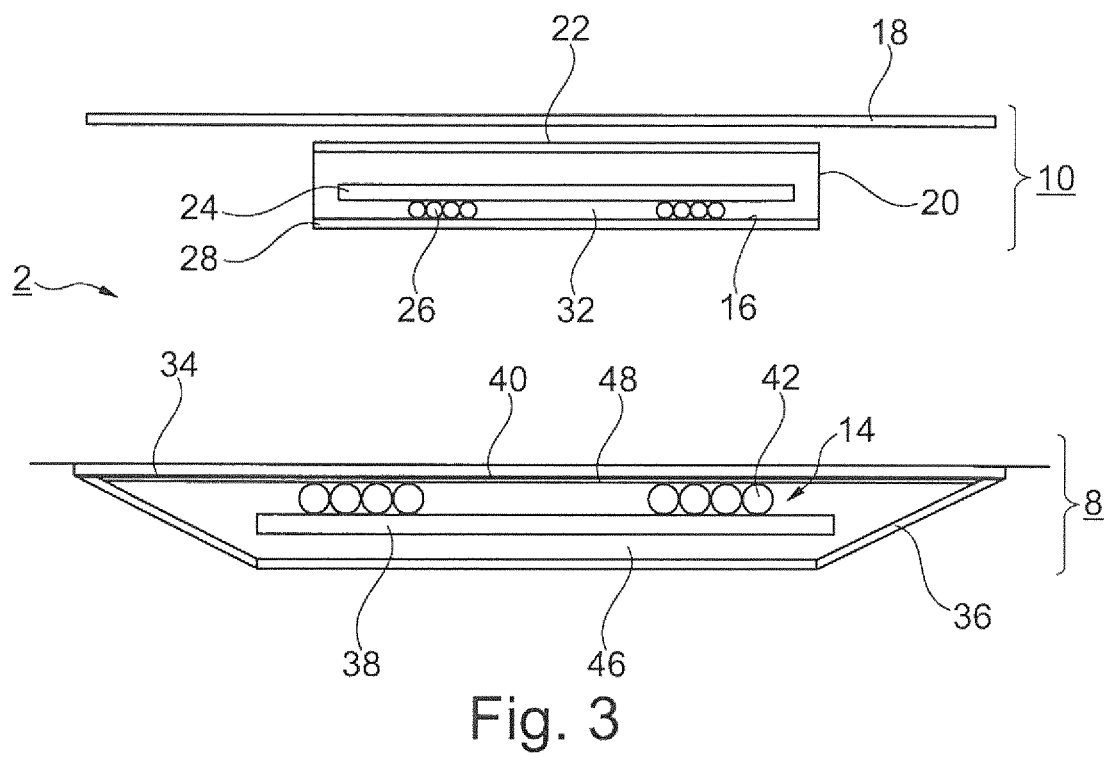
FIG. 3 is a schematic lateral illustration of the construction of the secondary coil system and of a primary coil system that is disposed in the hard ground.

The primary coil system 8 in FIG. 3 is of substantially identical construction but is disposed within the ground. For this purpose, the overrun protection 34 is a substantially flat plate which is flush with the ground surface, wherein the shielding plate 36 in this exemplary embodiment as a housing of the primary coil system 8 has an approximately trapezoidal shape.

Figure 4:
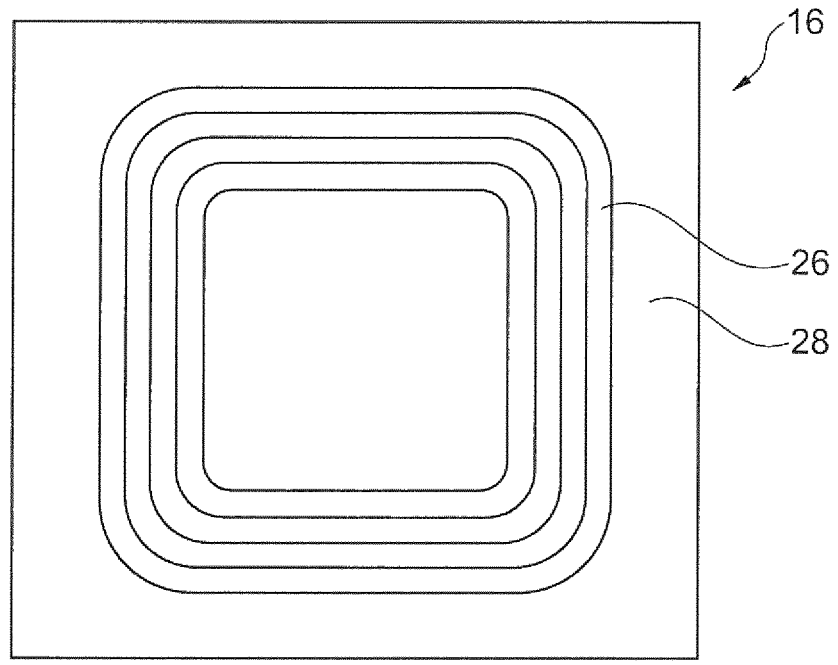
FIG. 4 is a plan view of a coil profile of a coil wire of a secondary coil on a carrier cross-laid structure of the secondary coil system.
Figure 5:
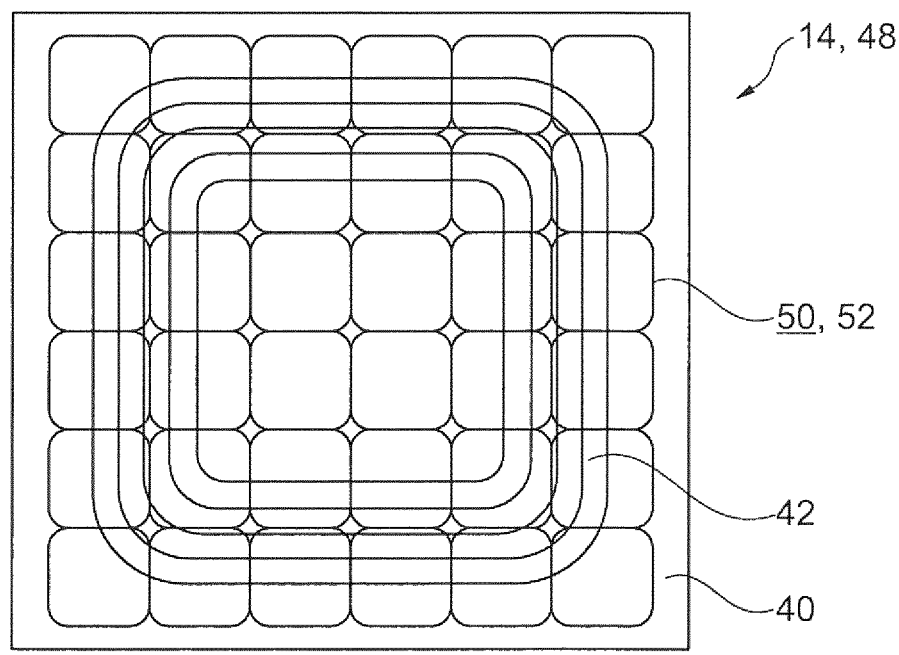
FIG. 5 is a plan view of a primary coil system having thereabove a stitched array of sensor coils as the sensory coil assembly.

As can be seen in FIG. 4 and FIG. 5, the coil wires 26, 42, in an approximately square shaped coil profile having rounded corner regions, are stitched to the carrier cross-laid structures 28, 42. The sensor coil assembly 48 of the primary coil system 8 has a number of sensor coils 50 which, in a tile-type pattern, are sewn as an array to the carrier cross-laid structure 40, so as to be above the coil profile of the primary coil 14. In an exemplary manner, only one sensor coil 50 is provided with a reference sign in the figures.

The sensor coils 50 are formed by thin enameled wires as sensor wires 52 in square shaped conductor loops. In the operation of the charging device, the sensor coil assembly 48 serves for detecting the alternating magnetic field in a localized manner and, for easier positioning of the secondary coil assembly 16, is thus employable above the primary coil assembly 14. The sensor coil assembly 48 is furthermore used for monitoring the intermediate region between the induction coils 14, 16, and in particular for an identification of foreign matter in this region.

As is indicated in FIG. 5, the sensor wires 52 and the coil wire 42 are stitched on top of one another to the carrier cross-laid structure 40. The sensor wires 52 and the coil wire 42 in this exemplary embodiment are fastened by stitching by way of the same stitching wire 44. Additionally or alternatively, the stitching wire 44 is embodied from an electrically conductive material, for example is embodied as a thin copper wire, and is coupled to an evaluation unit (not illustrated in more detail) of the primary coil assembly 14. In the operation of the charging device 2, the evaluation unit monitors for example an electrical current which flows through the stitching wire 44, said evaluation unit being suitable and specified to signal damage to the primary coil assembly 14 in the event of this current being interrupted.

In the operation of the charging device 2, in particular the four sensor coils 50 that are disposed so as to be centric within the coil profile of the primary coil 14, for the purpose of improved positioning are used for a transmission of data to the secondary coil 16.

Figure 6:
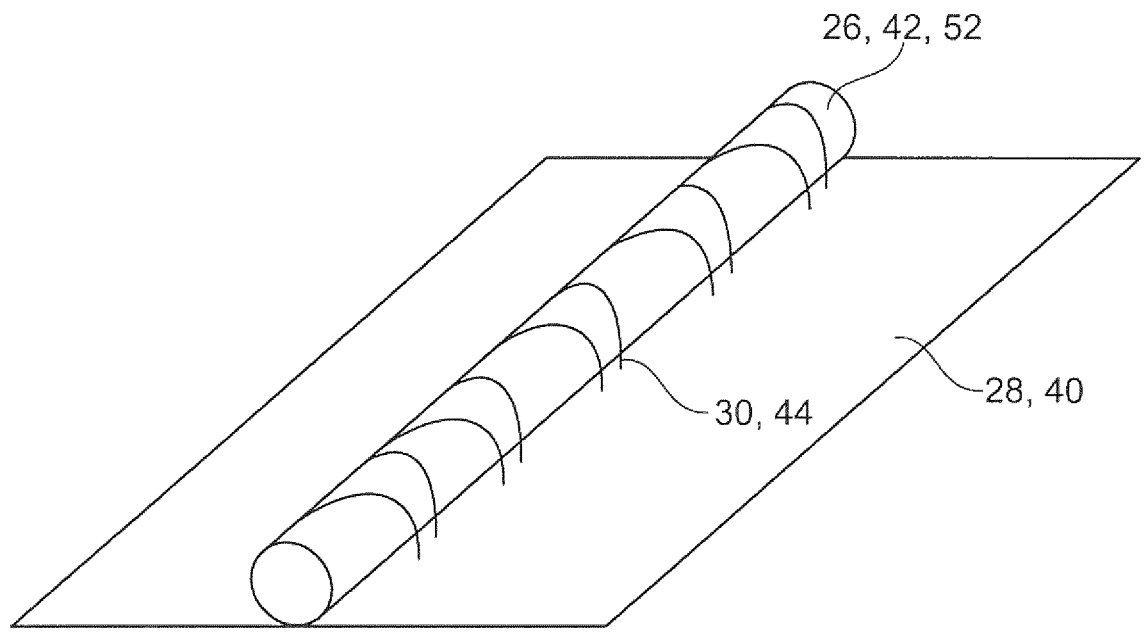
FIG. 6 is a perspective illustration of a fragment of a coiling wire which is fastened to the carrier cross-laid structure by stitching by means of a stitching wire.
Figure 7:
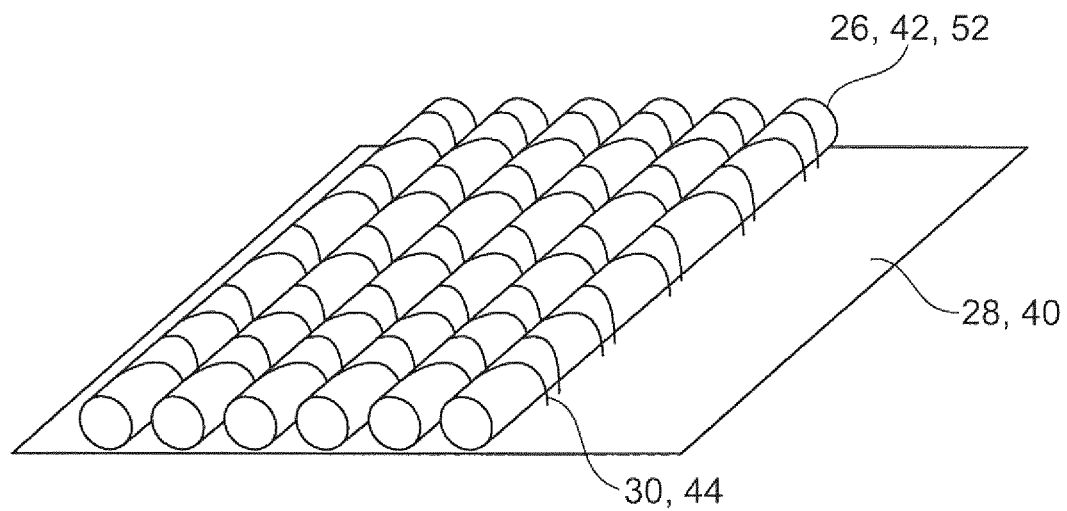
FIG. 7 is a perspective illustration of six neighboring paths of the coil profile that is fastened by stitching, wherein each path is individually fastened by stitching.
Figure 8:
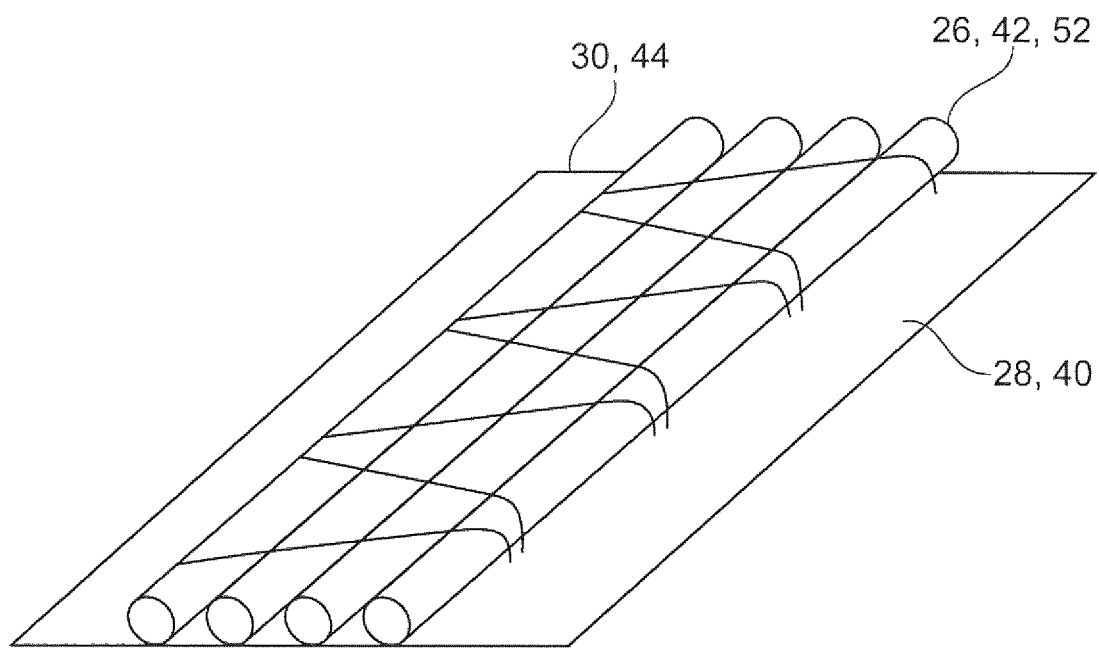
FIG. 8 is a perspective illustration of four neighboring paths of the coil profile, wherein the paths are fastened by stitching by means of one stitching wire that collectively spans the paths.

Various types of the fastening of the coil wires 26, 42 and of the sensor wires 52 by stitching to the carrier cross-laid structures 28 and 40 are explained hereunder in more detail by means of FIGS. 6 to 8. The coil wires 26, 42 and the sensor wires 52 hereunder are collectively also referred to as coiling wires 26, 42, 52.

FIG. 6 shows in fragments a single coiling wire 26, 42, 52 which, by means of the stitching wire 30, 44, is stitched to the carrier cross-laid structure 28, 40. The stitching wire 30, 44 herein crosses the coiling wire 26, 42, 52 in a substantially perpendicular manner at a plurality of joints across the entire length of the coiling wire 26, 42, 52. FIG. 7 shows in fragments six parallel neighboring paths of the coiling wire 26, 42, 52, having a fastening of the individual paths by way of a stitching wire that is stitched in a similar manner. An alternative fastening by stitching, in which a plurality of neighboring paths of the coiling wire 26, 42, 52 are stitched to the carrier cross-laid structure 28, 40 with a single switching wire 30, 44 so as to be spanned in a zigzag-type stitch pattern is illustrated in FIG. 8.

Figure 9:
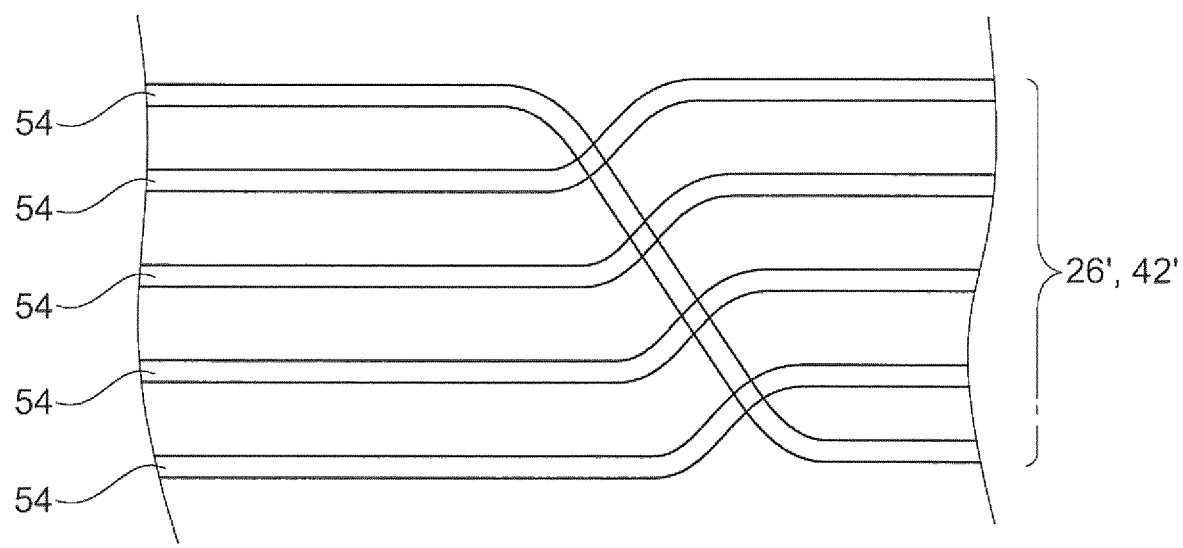
FIG. 9 is a plan view of a coil profile having a plurality of individual wires, wherein the individual wires are disposed in the manner of stranded conductors and in a permuting manner.

An alternative design embodiment of the stranded conductor-type coil wires 26', 42' is illustrated in FIG. 9. In this exemplary embodiment, a plurality of stitched individual wires 54 that, as part-strands, are disposed beside one another are used instead of one prefabricated high-voltage stranded conductor. The individual wires 54 at the ends thereof are inter-coupled in an electrically conductive manner and are thus switched substantially in parallel. In order for a uniform distribution of the current to be ensured, the individual wires 54, as can be seen in FIG. 9, are installed in particular in a permuting manner, that is to say that each individual wire 54 assumes each position of the path at least once. To this end the individual wires 54 are installed in a mutually crossing manner such that twisting of the individual wires 54 in the manner of a stranded conductor is established.

LIST OF REFERENCE SIGNS

2 Charging device
4 Energy accumulator
6 Motor vehicle
8 Primary coil system
10 Secondary coil system
12 Power cable 14 Primary coil/induction coil
16 Secondary coil/induction coil
18 Shielding plate
20 Component
22 Metal plate
24 Ferrite plate
26, 26' Coil wire/coiling wire
28 Carrier cross-laid structure
30 Stitching wire
32 Protective material
34 Overrun protection
36 Shielding plate
38 Ferrite plate
40 Carrier cross-laid structure
42, 42' Coil wire/coiling wire
44 Stitching wire
46 Protective material
48 Sensor coil assembly
50 Sensor coil
52 Sensor wire
54 Individual wire The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an induction coil for a charging device for wirelessly charging an electrical energy accumulator of an electrically drivable motor vehicle, the method comprising the acts of:
    placing at least one coil wire onto a first surface of a carrier cross-laid structure in a conductor-loop coil profile without passing the at least one coil wire into the carrier cross-laid structure;
    fastening, by stitching, the at least one coil wire onto the first surface of the carrier cross-laid structure via at least one electrically conductive stitching wire; and
    coupling the electrically conductive stitching wire to an evaluation unit configured to detect damage to the induction coil.

2. The method as claimed in claim 1, wherein the coil wire is arranged on the carrier cross-laid structure in a helical coil profile.

3. The method as claimed in claim 1, wherein the coil wire is arranged in paths of the coil profile that run in parallel.

4. The method as claimed in claim 3, wherein in the case of fastening by stitching, a plurality of neighboring paths of the coil wire are spanned by one stitching thread.

5. The method as claimed in claim 1, wherein
    the coil wire is formed by a number of individual wires,
    the individual wires are arranged in parallel paths in a permuting manner such that each individual wire in the coil profile assumes each position of the path at least once.

6. The method as claimed in claim 1, further comprising the act of: stitching a sensor wire of a sensor coil to the carrier cross-laid structure.

7. The method as claimed in claim 6, wherein the sensor wire is disposed so as to be centric within the coil profile.

8. A charging device for wirelessly charging an electrical energy accumulator of an electrically drivable motor vehicle, the charging device comprising:
    a stationary primary coil;
    a vehicle-side secondary coil, wherein the primary coil is capable of being coupled inductively to the secondary coil for charging of the electrical energy accumulator; and
    a sensor coil assembly that positions the secondary coil in a region of the primary coil,
    wherein at least one of the secondary coil and the primary coil comprise at least one coil wire arranged onto a first surface of a carrier cross-laid structure in a conductor-loop coil profile and fastened, without passing into the carrier cross-laid structure, via stitching using an electrically conducting stitching wire, onto the first surface of the carrier cross-laid structure, and
    wherein the electrically conducting stitching wire is coupled to an evaluation unit configured to detect damage to the at least one of the secondary coil and the primary coil.

9. The charging device as claimed in claim 8, wherein the sensor coil assembly comprises an array of neighboring sensor coils.

* * * * *